(12) United States Patent
Oakes

(10) Patent No.: US 10,316,729 B2
(45) Date of Patent: Jun. 11, 2019

(54) COUPLING

(75) Inventor: William Oakes, Lowestoft (GB)

(73) Assignee: NEXEN LIFT TRUCKS LIMITED, Lowestoft, Suffolk (GB)

( * ) Notice: Subject to any disclaimer, the term of this patent is extended or adjusted under 35 U.S.C. 154(b) by 1280 days.

(21) Appl. No.: 13/634,007

(22) PCT Filed: Mar. 9, 2011

(86) PCT No.: PCT/GB2011/050465
§ 371 (c)(1),
(2), (4) Date: Oct. 24, 2012

(87) PCT Pub. No.: WO2011/110851
PCT Pub. Date: Sep. 15, 2011

(65) Prior Publication Data
US 2013/0127157 A1 May 23, 2013

(30) Foreign Application Priority Data

Mar. 11, 2010 (GB) .................................. 1004035.0
Apr. 12, 2010 (GB) .................................. 1006044.0

(51) Int. Cl.
B60K 13/04 (2006.01)
F01N 13/18 (2010.01)
(Continued)

(52) U.S. Cl.
CPC .......... F01N 13/1844 (2013.01); B60K 13/04 (2013.01); B66F 9/07513 (2013.01);
(Continued)

(58) Field of Classification Search
CPC ... F16L 23/032; F16L 23/0283; F16L 23/028;
B66F 9/07554; B66F 9/07513; B60K 13/04; F01N 13/1805
(Continued)

(56) References Cited

U.S. PATENT DOCUMENTS 459,907 A * 9/1891 Hogan ..................... F16L 19/08
285/415
1,186,325 A * 6/1916 Metzger ................ F16L 15/006
285/415
(Continued)

FOREIGN PATENT DOCUMENTS

WO WO 2010071380 A2 * 6/2010 ........... B62D 49/085

Primary Examiner — David Bochna
(74) Attorney, Agent, or Firm — McGarry Bair PC

(57) ABSTRACT

An exhaust system having a pipe for conveying exhaust from an engine, the end of which has an outwardly-protruding lip; a first pipe flange having a hole large enough to allow the lipped end of the pipe to pass through it, and a recessed shoulder adjacent the hole; a collar, configured to releasably encircle said first pipe, to abut with the recessed shoulder at its outer periphery, and the lipped end of the pipe at its inner periphery, thereby preventing the collar and lipped pipe assembly from passing through said hole; and a second pipe flange configured to attach to said first pipe flange to connect a tail pipe to the first pipe, and to hold the pipe, flange and collar assembly together. The invention also provides counterweights for counterweighted lift trucks adapted to secure such exhaust systems, and methods of fitting such exhaust systems.

12 Claims, 9 Drawing Sheets

(51) Int. Cl.
*B66F 9/075* (2006.01)
*F16L 23/028* (2006.01)
*F16L 23/032* (2006.01)

(52) U.S. Cl.
CPC ...... *B66F 9/07554* (2013.01); *F01N 13/1805* (2013.01); *F16L 23/028* (2013.01); *F16L 23/0283* (2013.01); *F16L 23/032* (2013.01); *B60Y 2200/15* (2013.01); *F01N 13/1855* (2013.01); *F01N 2590/08* (2013.01); *Y10T 16/82* (2015.01); *Y10T 29/49947* (2015.01)

(58) Field of Classification Search
USPC .................................................. 285/414, 415
See application file for complete search history.

(56) References Cited

U.S. PATENT DOCUMENTS

| | | | | |
|---|---|---|---|---|
| 1,820,020 A * | 8/1931 | Hewitt | ................ | F16L 19/0206 285/12 |
| 2,264,512 A * | 12/1941 | Dunham | ............. | B66F 9/07513 414/635 |
| 2,561,300 A * | 7/1951 | Walker | ................ | B66F 9/07554 187/222 |
| 2,688,500 A * | 9/1954 | Scott | ....................... | F16L 49/06 277/614 |
| 2,768,847 A * | 10/1956 | Peyrin | ...................... | F16D 1/05 285/415 |
| 2,880,020 A * | 3/1959 | Audette | ................ | F16L 33/222 285/148.13 |
| 3,787,086 A * | 1/1974 | Cosby | ...................... | B60K 1/04 180/273 |
| 4,229,029 A * | 10/1980 | Boyer | .................. | F16L 33/222 285/242 |
| 4,432,572 A * | 2/1984 | Thalmann | ............... | F16L 23/02 285/415 |
| 4,448,448 A * | 5/1984 | Pollia | ..................... | F16L 23/18 285/415 |
| 4,640,530 A * | 2/1987 | Abbes | ..................... | F16L 19/02 285/18 |
| 6,079,753 A * | 6/2000 | Erwin | ................ | F01N 13/1805 285/415 |
| 6,331,020 B1 * | 12/2001 | Brunella | ............... | F16L 23/032 285/415 |
| 6,460,901 B2 * | 10/2002 | Rochelle | ............ | F16L 19/0231 285/415 |

* cited by examiner

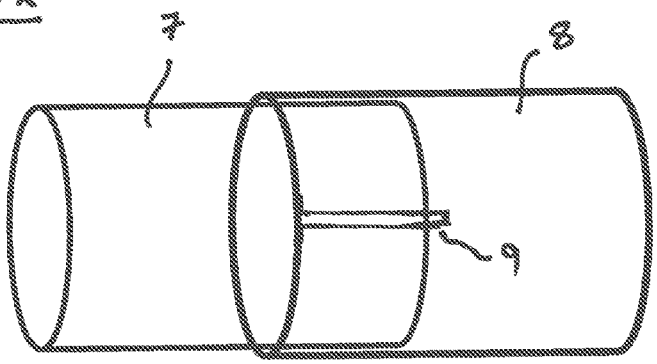
Figure 2 — PRIOR ART
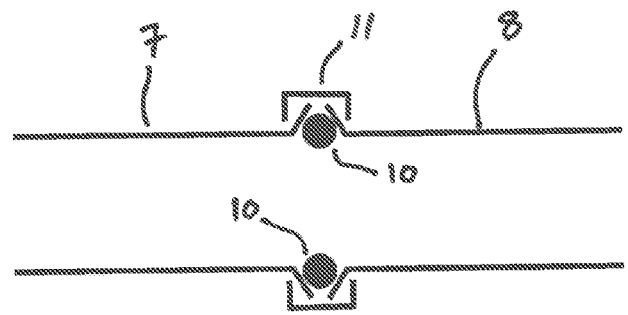
Figure 3 — PRIOR ART
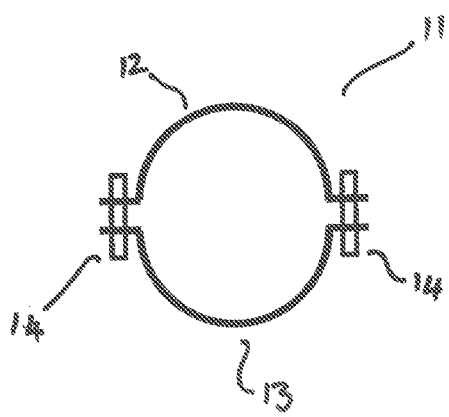
Figure 4 — PRIOR ART

COUPLING

CROSS-REFERENCE TO RELATED APPLICATIONS

This application is a National Phase application of International Application No. PCT/GB2011/050465, filed Mar. 9, 2011, which claims the benefits of GB1004035.0, filed Mar. 11, 2010 and GB1006044.0, filed Apr. 12, 2012, all of which are incorporated herein by reference in their entireties.

FIELD OF THE INVENTION

The invention relates to exhaust systems and couplings therefor, and especially to exhaust systems and couplings for use in counterweighted or armoured vehicles, especially counterweighted lift trucks and the like. The invention also relates to counterweights for such vehicles.

BACKGROUND AND PRIOR ART KNOWN TO THE APPLICANT

Counterweighted lift trucks are widely used in industry, e.g. forklift trucks and other elevated platforms. FIG. 1 illustrates, in perspective view, a typical forklift truck 1 that may be used to move pallets in a warehouse environment. The forklift truck has a fork arrangement 2 at the front of the truck to engage with a pallet to be lifted and a lifting mechanism 3 to enable the forks to be raised and lowered as required. In order to prevent the truck from toppling over when carrying a load on the forks, a counterbalance weight 4 is provided at the rear of the vehicle. Such counterbalance weights are often styled to resemble body panels, but in fact consist of a large block of dense material, such as cast iron. In many forklift truck systems, these counterweights may weigh anything up to 1-1.5 tonnes. In many such systems, and in order to further increase the counterbalance effect, the engine for the vehicle is located within a cavity behind the counterweight 4. In effect, the counterweight 4 is generally concave in construction, with the engine sitting partially within the envelope created by the counterweight.

For forklift trucks that use internal combustion engines, exhaust from the engine must be vented to atmosphere. Because such forklift trucks are often used in a confined environment, it is often necessary that the exhaust tail pipe 5 vents at a relatively high level on the vehicle. As a result, it is often required that the tail pipe 5 passes through the counterweight 4. Such vehicles are often used in cramped environments, and it is common that the tailpipe 5 becomes damaged—especially when located in an elevated position—and needs to be replaced. This requires that the coupling between the exhaust tail pipe and the rest of the exhaust system is dismantled and reassembled to allow replacement. Due to the large mass of the counterweight 4, it is not feasible to remove the counterweight to gain access to the engine compartment. As a result, the counterweights are often provided with access holes 6 through which limited access may be granted to the engine compartment and the exhaust coupling.

FIGS. 2-4 illustrate typical exhaust couplings used in the industry. FIG. 2 shows an arrangement in which two sections of exhaust pipe 7, 8 may be joined by providing a slightly larger diameter end to one of the pipes 8, for example by flaring the end of the pipe, and by providing a slit 9 extending a short way along the axis of the pipe. In this way, one pipe 7 may be inserted into the end of the other pipe 8 and the two pipes clamped together by means of a circular clip (not illustrated).

FIG. 3 illustrates another common alternative configuration, in cross-sectional view. In this system, the two pipes 7, 8 are provided with a flared or flanged end and the pipes are abutted against each other with an interposing sealing ring or gasket 10. Once assembled in this configuration, the pipes and gasket are held together by a circular clip 11 surrounding the assembly. Such a clip 11 is shown in plan view in FIG. 4 comprising two arcuate portions 12, 13 connected at each end by fasteners 14 usually comprising a screw arrangement.

It will be appreciated that assembling and disassembling such couplings within the confined environment of the engine compartment such as a lift truck, where access is only available through small access holes 6 is extremely difficult. Dexterity is required to manipulate the exhaust pipe couplings, which is ideally a two-handed operation, although the small access holes rarely allow both hands to be inserted into the engine compartment. As a result, significant downtime is often experienced when tail pipes need to be changed on lift trucks, thereby leading to operational difficulties and lost working time.

It is amongst the objects of the present invention to provide a solution to this and other problems. It will be appreciated that the solutions proposed are equally applicable to situations where exhaust pipes need to pass through armour plating, for example on military vehicles.

SUMMARY OF THE INVENTION

Accordingly, the invention provides an exhaust system comprising: a first pipe for conveying exhaust from an engine, the end of said first pipe distal from the engine having a lip protruding outwardly from the pipe; a first pipe flange having a hole large enough to allow the lipped end of said pipe to pass through it, and a recessed shoulder adjacent said hole; a collar, configured to releasably encircle said first pipe, to abut with said recessed shoulder at its outer periphery, and abut the lipped end of said pipe at its inner periphery, thereby preventing the collar and lipped pipe assembly from passing through said hole; and a second pipe flange configured to attach to said first pipe flange to operably connect a tail pipe to said first pipe, and to hold said pipe, flange and collar assembly together.

With such a system, the exhaust pipe from the exhaust manifold may be passed through a hole, or channel through a counterweight, or a heavily armoured section of an armoured vehicle, and located and temporarily secured in the first pipe flange by means of the collar, or locking ring. The assembly may then be secured by use of the second flange connecting a tail pipe to the exhaust pipe. In this way, assembly and disassembly of the exhaust system, for example to change the tailpipe may be performed requiring only minimal access to the engine compartment—elements of the assembly and disassembly process requiring manual dexterity are carried out outside the engine compartment itself.

In a particular embodiment, the invention provides an exhaust system for a counterweighted lift truck comprising an exhaust system as described above wherein said first pipe flange comprises fixing points to affix it to a counterweight adjacent a channel passing through said counterweight such that the hole in said first pipe flange is substantially aligned with said channel.

In any such embodiment, said collar comprises a plurality of collar sections, thereby allowing it to releasably encircle said pipe. For practical purposes, such a collar may be of two-part construction. However, more parts such as three or four would also function.

In alternatively preferred embodiments said collar is formed of a deformable material, such as plastics, thereby allowing it to releasably encircle said pipe. More preferably, said deformable material is resiliently deformable. By use of a single-part deformable construction, the collar can be deformed to encircle the pipe, for example by twisting the collar. The collar can then be returned to an encircling configuration; when a resiliently deformable material is used, the collar will automatically spring back to its encircling configuration, thereby allowing the operation to be carried out with a single hand, leaving the other hand free to steady or hold the exhaust pipe.

In any such system, the system preferably further comprises a gasket interposed between said first pipe and said tail pipe.

Also in any aspect of the invention, it is preferred that said first pipe further comprises a flexible coupling between the engine and said lipped end. In this way, manipulation of the lipped end of the exhaust pipe to pass it through the counterweight is facilitated.

When the system is used with a counterweighted lift truck, then in preferred embodiments, said pipe flange is integral with said counterweight. Where the channel through the counterweight exits at the external surface of the counterweight, a mating surface is provided around the channel, in addition to a recessed shoulder within the channel, to accept the lipped end of the exhaust pipe and a collar surrounding it, thereby locating and holding the lipped end on the recessed shoulder.

The invention also provides a counterweight for a counterweighted lift truck comprising a channel passing through said counterweight, so sized as to allow an exhaust pipe to pass through it, said counterweight having fixing points adjacent said channel configured to join said counterweight to an exhaust pipe flange.

The invention further provides a counterweight for a counterweighted lift truck comprising a channel passing through said counterweight, so sized as to allow an exhaust pipe to pass through it, a recessed shoulder and flange mating surface adjacent said channel and fixing points on the external surface of said counterweight disposed about and adjacent said channel to allow the connection of a flange.

Also included within the scope of the invention is a method of fitting an exhaust system to a counterweighted lift truck comprising the steps of: providing a counterweight having a channel passing through it; providing an exhaust pipe for conveying exhaust from an engine, said exhaust pipe having an outwardly-protruding lip at an end distal from said engine; passing said exhaust pipe through said channel; fitting a collar around said exhaust pipe to engage with said lip; engaging said collar with a recessed shoulder in a first pipe flange attached to said counterweight adjacent said channel; operably connecting a tailpipe to said exhaust pipe with a second flange, said second flange acting to hold said pipe, flange and collar assembly together. Preferably, said first pipe flange is integral with said counterweight.

Also included within the scope of the invention is an exhaust system substantially as described herein, with reference to and as illustrated by any appropriate combination of FIGS. 5-12.

BRIEF DESCRIPTION OF THE DRAWINGS

The invention will be described with reference to the accompanying drawings in which:

FIGS. 2-3 illustrate known exhaust pipe coupling systems;

FIG. 4 illustrates a plan view of a clip for the exhaust pipe coupling of FIG. 3;

DESCRIPTION OF PREFERRED EMBODIMENTS

Figure 1:
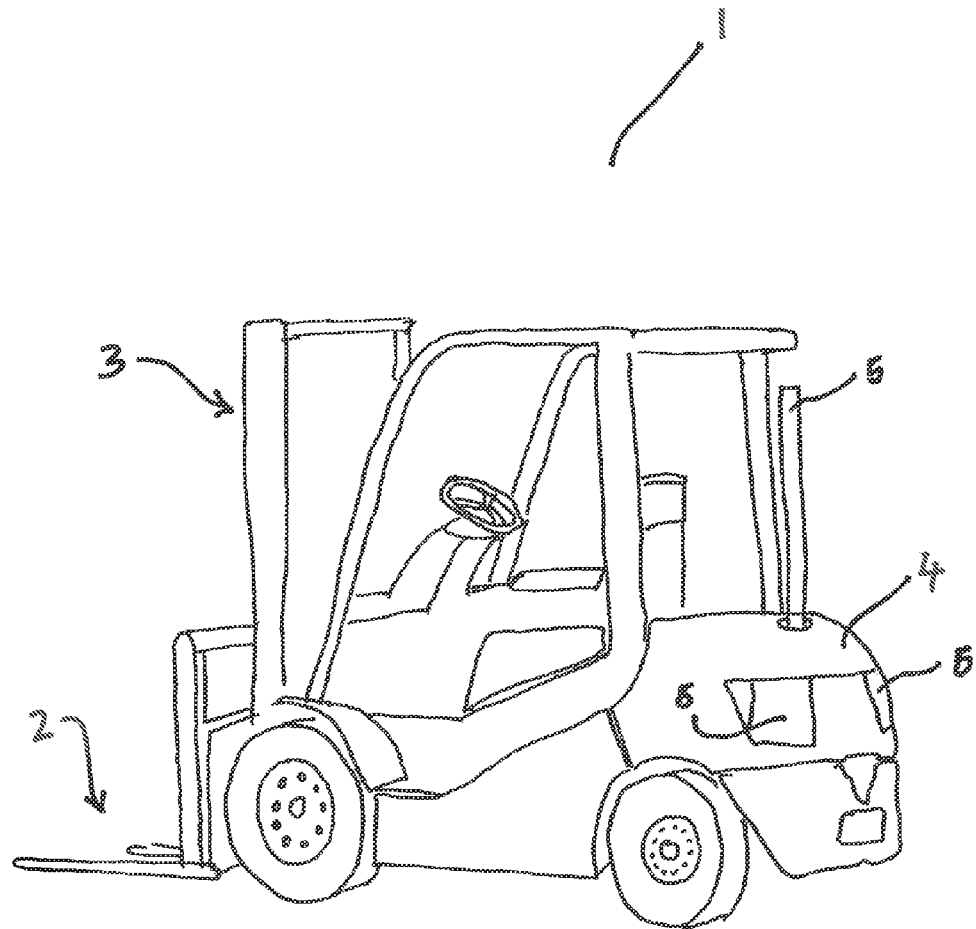
FIG. 1 is a perspective illustration of a counterweighted lift truck.
Figure 5:
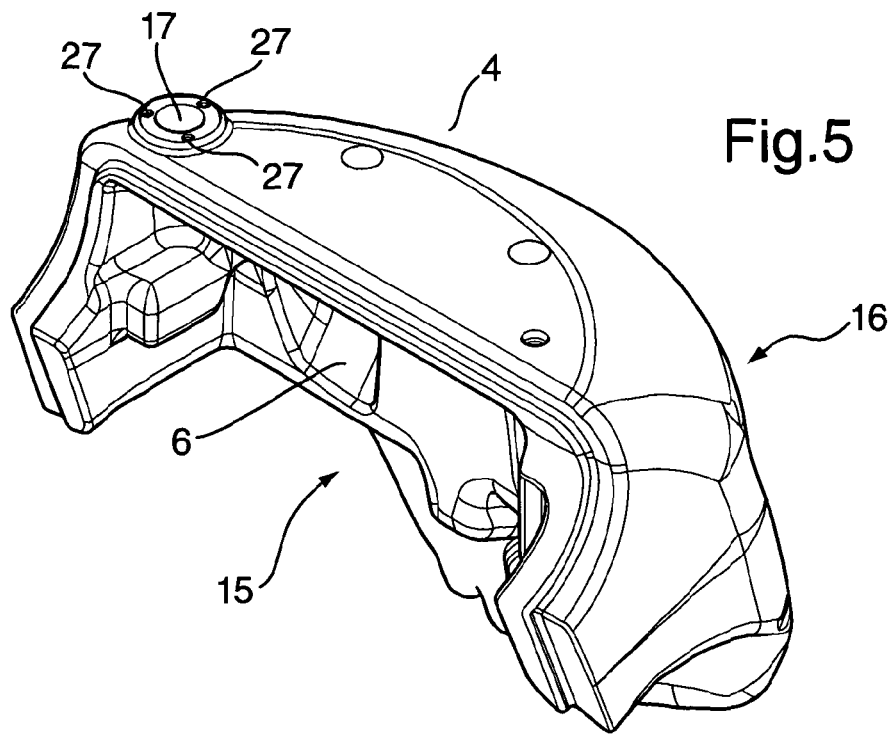
FIGS. 5 and 6 illustrate, in perspective view, counterweights for a counterweighted lift truck.
Figure 6:
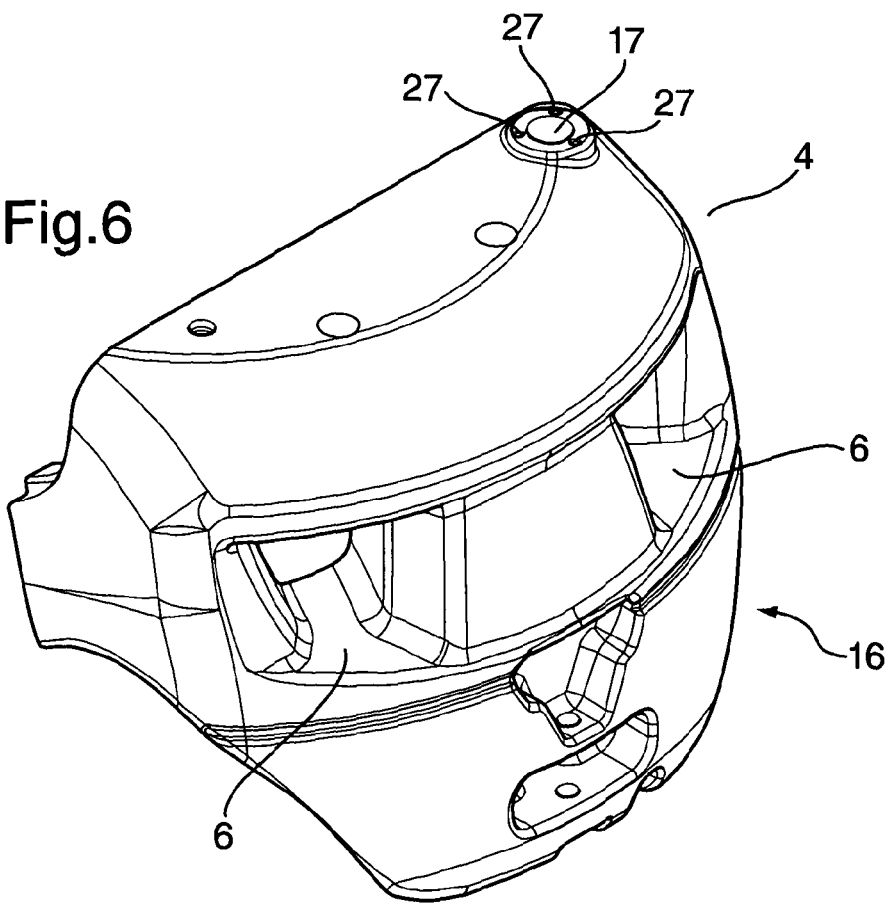

FIGS. 5 and 6 illustrate, in perspective view, typical counterweights 4 that might be used in a counterweighted lift truck. As can be seen, the counterweights are of a generally solid construction, and are typically made of cast iron. The counterweights have a generally concave side 15 forming part of the shell of the engine compartment, and a generally convex exterior side 16 forming the outside of the vehicle. Access holes 6 are provided affording limited access to the engine compartment.

An exhaust pipe channel 17 is provided, extending between the exterior face 16 and interior face 15 of the counterweight 4.

Figure 7:
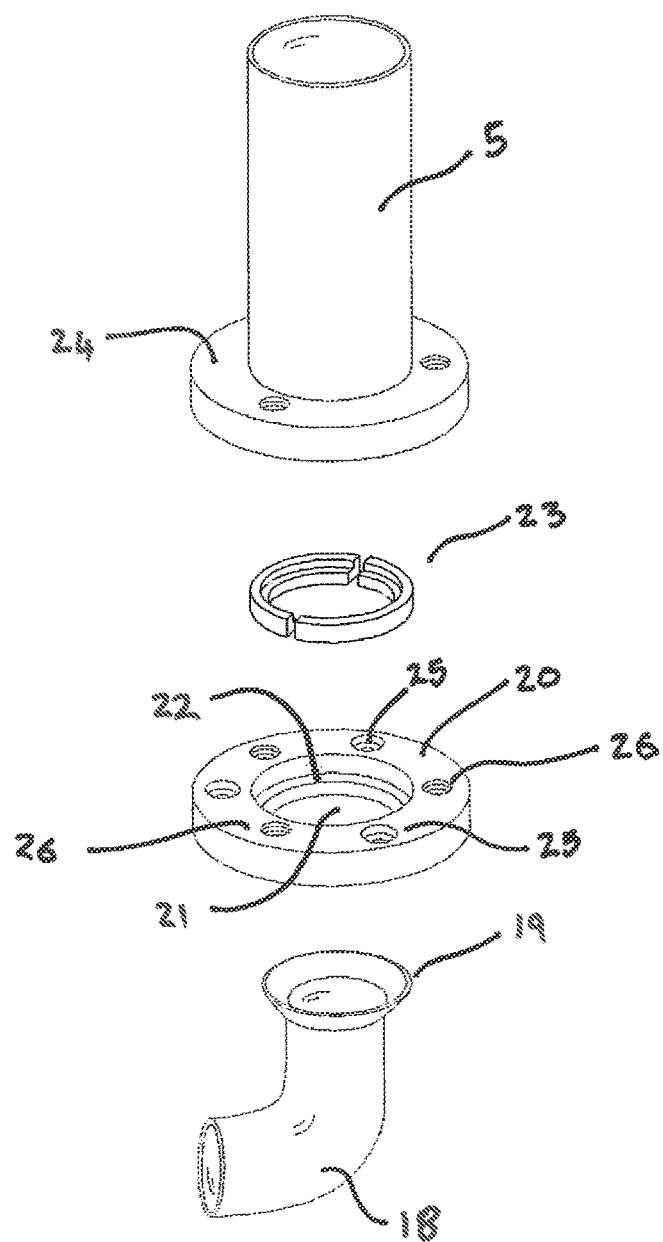
FIG. 7 illustrates, in exploded perspective view, an exhaust system of the present invention.

FIG. 7 illustrates, in exploded perspective view, an exhaust system according to the present invention. The system comprises a first pipe 18 for conveying exhaust from an engine (not illustrated). The end of this pipe 18 distal from the engine has a lip 19 protruding outwardly from the pipe 18. A first pipe flange 20 has a hole 21 large enough to allow the lipped end 18 of the pipe to pass through it. The flange 20 also has, adjacent the hole 21, a recessed shoulder 22. Also provided is a collar, or locking ring 23. In this embodiment, the collar 23 is of two-part construction having a generally L-shaped cross-section and so sized and shaped such that its outer periphery will sit on, and abut the recessed shoulder 22 of the flange 20, and its inner periphery will abut the lipped end 19 of the first pipe 18 once the unit is assembled.

There is also provided a second pipe flange 24 configured to attach to the first pipe flange 20 to operably connect a tail pipe 5 to the first pipe 18 and to hold the pipe flange and collar assembly together.

In this embodiment, the flange 20 is provided with two sets of holes, alternately spaced around the periphery of the flange 20. The first set 25 allow the flange 20 to be bolted to a counterweight 4, and the second set of holes 26, here provided with an internal thread, allow connection with the second flange 24.

Referring back to FIGS. 5 and 6, we see that surrounding the channel 17 is a mating surface provided with three threaded holes 27 to allow the connection of the first flange 20 to the outer surface of the counterweight 4 such that the hole 21 in the first pipe flange is substantially aligned with the channel 17.

In use, the flange 20 is bolted onto the outer surface of the counterweight 4 and, to connect the exhaust pipe 18, the pipe is passed through the channel 17 and the hole 21 of the first flange. The collar 23 is then located in the gap between the pipe 18 and the flange 20, the collar 23 sitting on the recessed shoulder 22 of the flange 20, thereby holding the pipe in position but abutting the lipped end 19 of the pipe. To secure the assembly, the second flange 24 is then bolted to the first flange 20. The inventors have found that this provides an adequate seal between the two pipes, but if further sealing is required, a gasket or sealing ring may be interposed between the two flanges.

In this way, assembly and disassembly of the exhaust pipe coupling may readily be made without having to manipulate pipe clips such as those illustrated in FIG. 4 within the confined space of the engine cavity.

Figure 8:
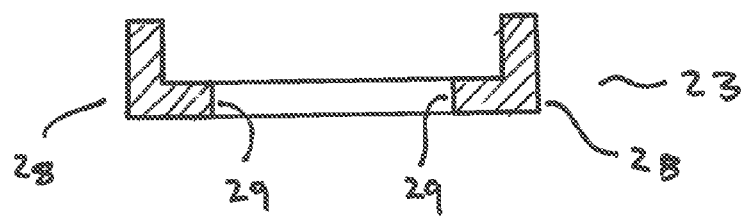
FIGS. 8 and 9 illustrate in cross-section and plan view respectively, a collar forming part of an exhaust system of the present invention.
Figure 9:
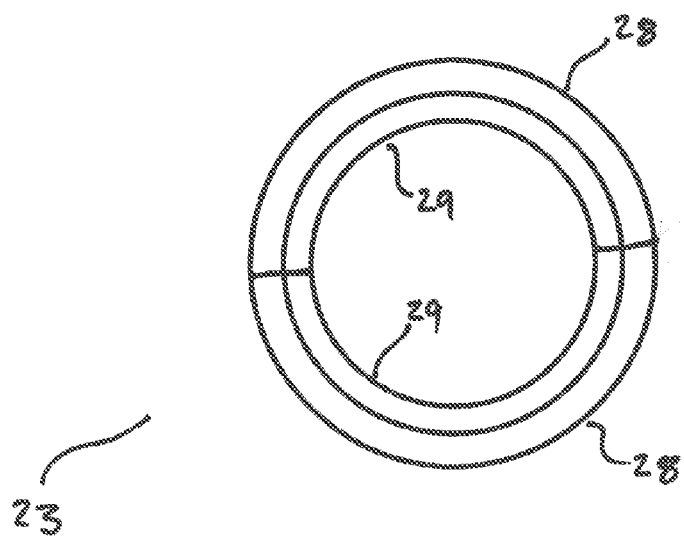

FIGS. 8 and 9 illustrate, in cross-section and plan view respectively, a collar 23 for use in an exhaust system of the present invention. The collar is of generally circular construction and in two-part form. The collar has a generally L-shaped cross-section with its outer periphery 28 sized and shaped to abut with and sit on the recessed shoulder 22 of the first flange 20. Its inner periphery 29 defines a hole through which the lipped end 19 of the first pipe 18 may be passed.

It will be appreciated that the collar 23 of this embodiment is of two-part construction such that the parts may be releasably placed around the first pipe 18 to secure within the flange 20.

In alternative configurations, the collar 23 may be constructed as a single part, again having a generally L-shaped cross-section and of generally circular plan view. In such a configuration, the collar 23 is fabricated from a deformable material and has a break at a point around its circumference, thereby allowing the collar 23 to be deformed to enable it to releasably encircle the exhaust pipe 18. Such a collar may be conveniently made of a plastics material such as nylon or PTFE. If a resiliently deformable material is used, this has the further advantage that the collar 23 may be deformed to pass it around an exhaust pipe 18, whereupon it will spring back to its at rest configuration. This prevents the risk of a two-part collar being dropped in the often busy and cramped environment in which such lift trucks operate.

Figure 10:
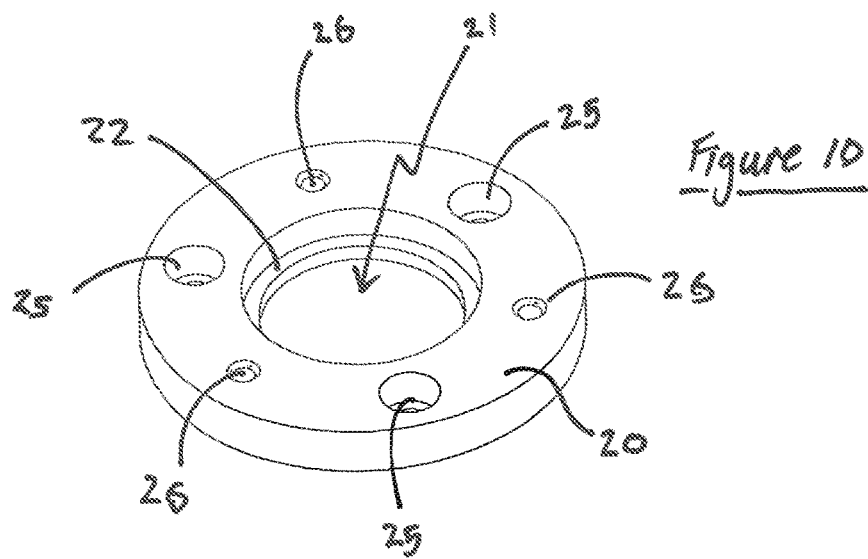
FIG. 10 illustrates, in perspective view, a first pipe flange forming part of an exhaust system of the present invention.

FIG. 10 illustrates, in perspective view, a first flange 20 forming part of an exhaust pipe system according to the present invention, to more clearly illustrate its features. The flange has a central hole 21 to accommodate the lipped end 19 of an exhaust pipe, a recessed shoulder 22 surrounding the hole, and two sets of alternately spaced holes around the periphery of the flange. The first set of holes 25 each themselves have a recessed shoulder and are each configured to accommodate a bolt to allow the flange 20 to be bolted onto a counterweight 4. A second set of threaded holes 26 is provided to allow a second flange 24 to be attached.

It will be appreciated that, in alternative embodiments of the invention, such a flange arrangement may be manufactured to be integral with a counterweight 4, by providing a recessed shoulder adjacent the channel 17 that penetrates the counterweight 4.

Figure 11:
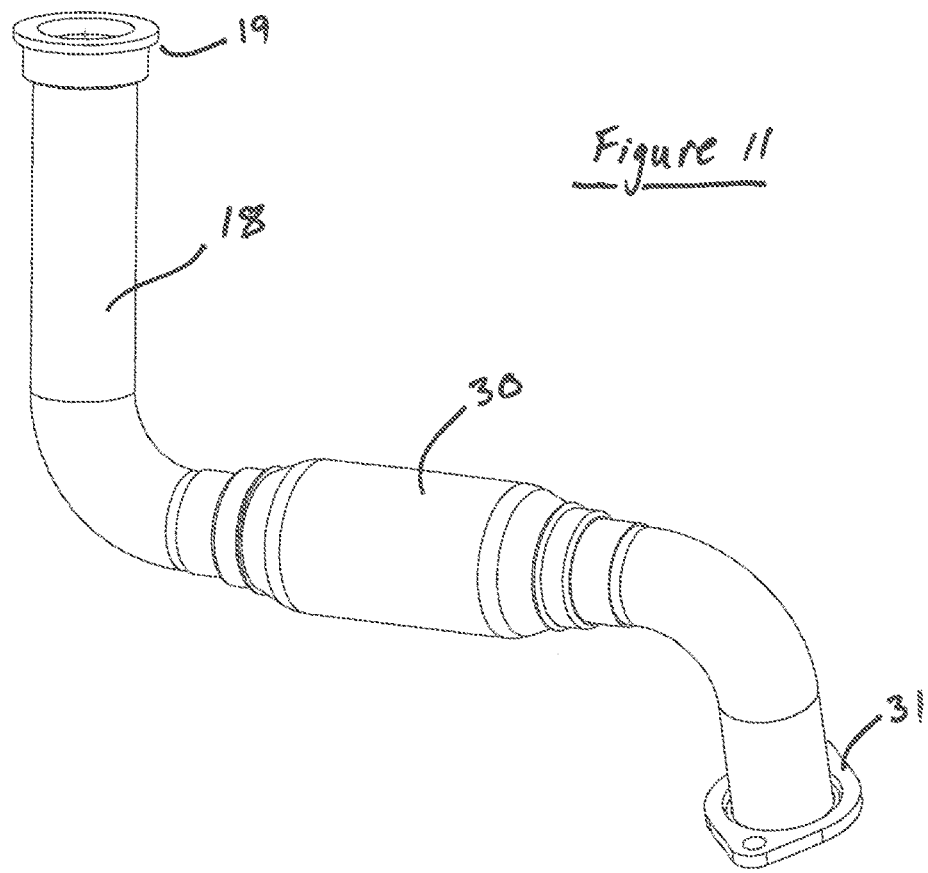
FIG. 11 illustrates, in perspective view a first pipe forming part of an exhaust system of the present invention.

FIG. 11 illustrates, again in perspective view, an exhaust pipe forming part of an exhaust system of the present invention. The pipe 18 has a lip 19 protruding externally from the pipe 18. In this embodiment, the lip 19 has the form of an extending flat rim around the pipe 18, in contrast to the flared embodiment illustrated in FIG. 7. In this embodiment, the pipe 18 is also provided with a flexible section 30 allowing the pipe 18 to be manipulated such that its lipped end 19 may be passed through a channel 17 in a counterweight 4. At the other end of the pipe is a connector 31 to allow the pipe to be connected to an exhaust manifold.

Figure 12:
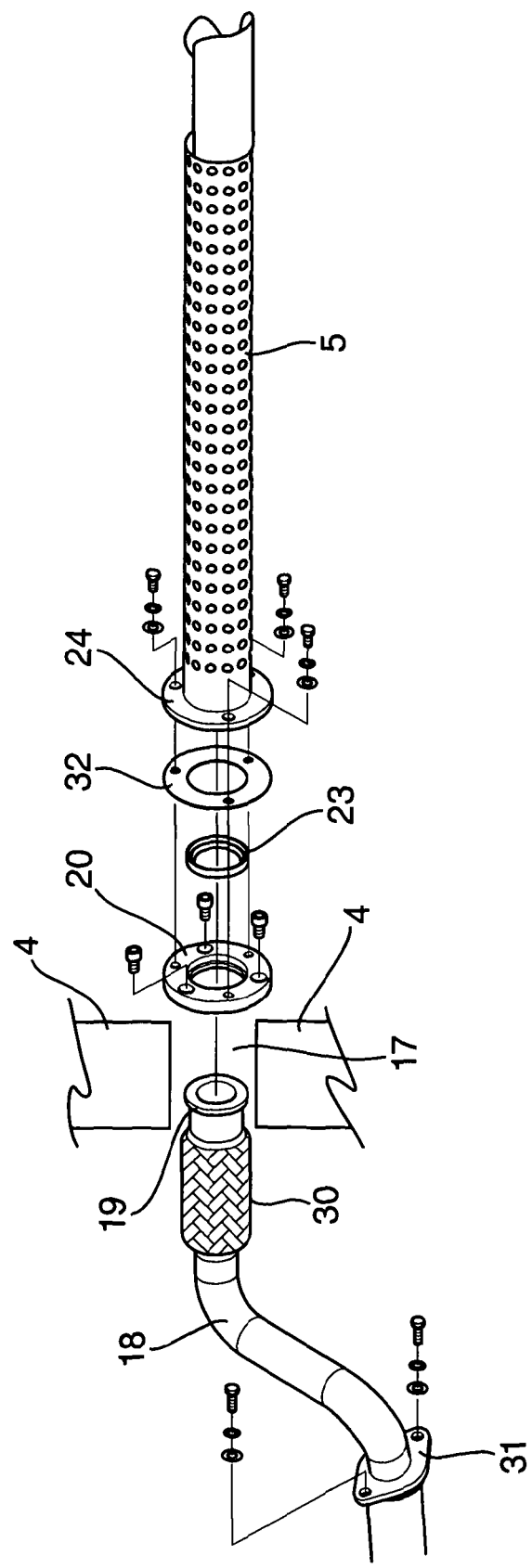
FIG. 12 illustrates, in exploded perspective view, an exhaust system according to the present invention.
Figure 13:
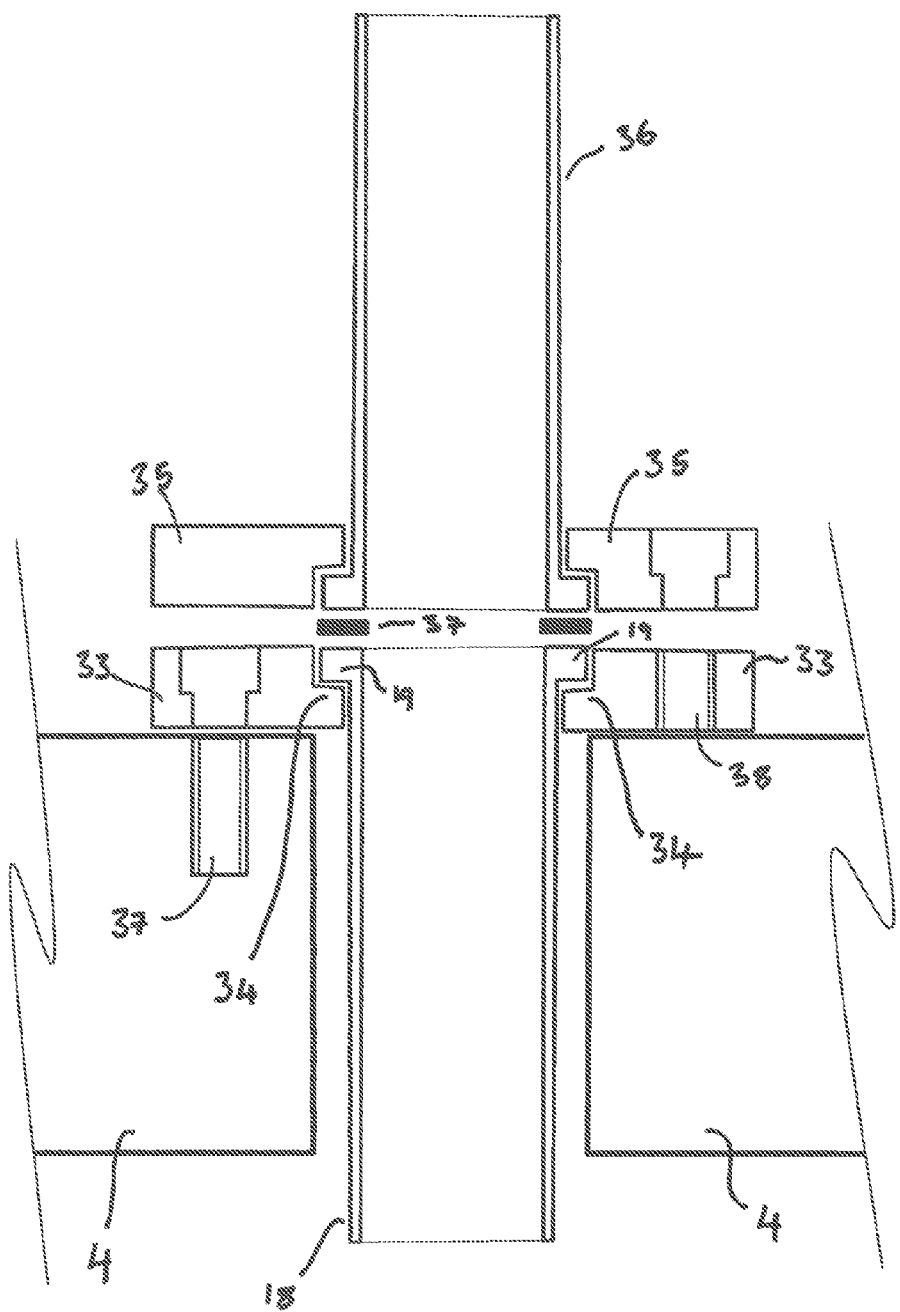
FIG. 13 illustrates a schematic sectional view of spaced pipe flanges for coupling two pipes.
Figure 14:
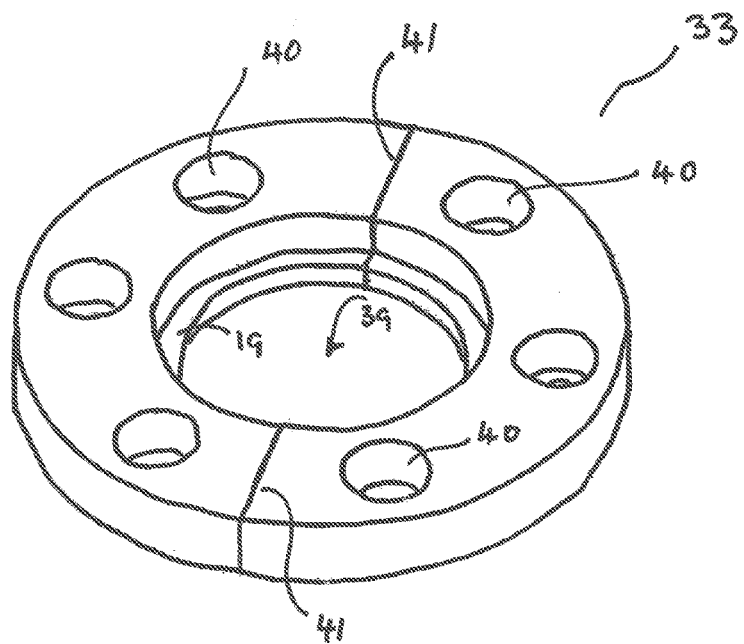
FIG. 14 illustrates a perspective view of one flanges of FIG. 13 combines as two parts.
Figure 15:
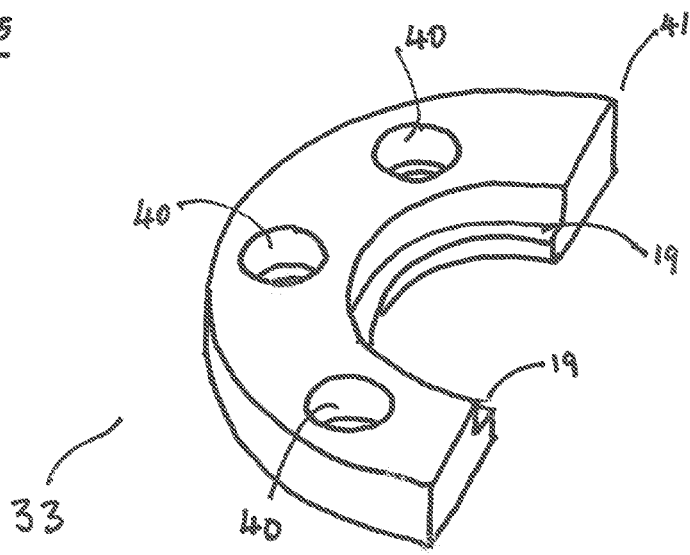
FIG. 15 illustrates a perspective view of one part of the flange of FIG. 14.

FIG. 12 illustrates, in exploded perspective view, an exhaust system of the present invention. The system comprises a first pipe 18 for conveying exhaust from an engine (not illustrated). The pipe 18 is connected to an exhaust manifold by means of connector 31. The exhaust pipe 18 is again provided with a flexible section 30 to enable the pipe to be more readily manipulated. The end of the pipe distal from the engine is provided with an outwardly-projecting lip 19. The end of the exhaust pipe 18 is passed through the channel 17 in the counterweight form and through the hole in the first flange 20. The collar 23 is then located around the exhaust pipe 18 causing it to be held on the recessed shoulder of the first flange 20. In this embodiment, a gasket 32 is provided, interposed between the first flange 20 and the second flange 24 attached to the tail pipe 5.

The invention claimed is:

1. A lift truck including a counterweight having a channel formed through said counterweight, in combination with an exhaust system comprising:
    a first pipe for conveying exhaust from an engine, said first pipe having a distal end remote from the engine, said distal end having an outwardly protruding lip;
    a first pipe flange having a hole therethrough, said hole being dimensioned to allow the distal end of said pipe to pass therethrough, and said flange having a recess defining a shoulder around said hole;
    a collar configured to releasably encircle the distal end of said first pipe and to be received in the recess abutting said shoulder, thereby preventing the collar and the distal end of the pipe passing through said hole; and
    a second pipe flange configured for attachment to said first pipe flange to operably connect a tail pipe to said first pipe and to hold together said pipe, said first pipe flange and said collar;
    wherein said first pipe flange includes fixing points, and the counterweight is provided with further fixing points adjacent said channel passing through said counterweight, the fixing points and further fixing points being arranged such that the hole in said first pipe flange is substantially aligned with said channel when the first pipe flange is secured to the counterweight by way of the fixing points and further fixing points.

2. An exhaust system according to claim 1 wherein said collar comprises a plurality of collar sections, thereby allowing the collar to releasably encircle said pipe.

3. An exhaust system according to claim 1 wherein said collar is formed of a deformable material, thereby allowing the collar to releasably encircle said pipe.

4. An exhaust system according to claim 3 wherein said deformable material is resiliently deformable.

5. An exhaust system according to claim 1 and including a tail pipe held to the distal end of the first pipe, and further comprising a gasket interposed between said first pipe and said tail pipe.

6. An exhaust system according to claim 1, wherein said first pipe further comprises a flexible coupling between said distal end and a proximal end of the first pipe for connection to an engine.

7. An exhaust system according to claim 1 wherein said first pipe flange is integral with said counterweight.

8. A counterweight for a counterweighted lift truck and comprising a channel passing through said counterweight, the channel being sized to allow an exhaust pipe to pass therethrough, said counterweight having fixing points adjacent said channel configured to join an exhaust pipe flange to said counterweight, said an exhaust pipe flange having a hole therethrough, whereby the hole is substantially aligned with the channel.

9. A counterweight for a counterweighted lift truck, wherein said counterweight comprises a channel passing therethrough and having an external end, the channel being sized to accommodate an exhaust pipe therein, the counterweight including a recess around the channel at the external end thereof, a shoulder being defined within the recess and there being fixing points on the external surface of said counterweight disposed around and adjacent said channel to allow the connection thereto of a flange of an exhaust system.

10. A method of fitting an exhaust system to a counterweighted lift truck comprising the steps of:
   providing a lift truck counterweight having a channel passing therethrough;
   providing on the counterweight a first pipe flange having a hole therethrough so that said hole is in alignment with the channel, the flange having a recess defining a shoulder around said hole;
   providing an exhaust pipe for conveying exhaust gas from an engine, said exhaust pipe having an outwardly-protruding lip at an end distal from said engine;
   passing said exhaust pipe through said channel;
   fitting a collar around said exhaust pipe to engage with said lip;
   engaging said collar with the shoulder in the first pipe flange; and
   operably connecting a tailpipe to said exhaust pipe with a second flange, said second flange acting to hold said pipe, flange and collar assembly together.

11. A method according to claim 10 wherein said first pipe flange is integral with said counterweight.

12. A lift truck including a counterweight having a channel formed through said counterweight, in combination with an exhaust system comprising:
   a first pipe for conveying exhaust from an engine, said first pipe having a distal end remote from the engine, said distal end having an outwardly protruding lip;
   a first pipe flange defined by the counterweight and having a hole therethrough aligned with said channel, said hole being dimensioned to allow the distal end of said pipe to pass therethrough, there being a recess in the first pipe flange defining a shoulder around said hole;
   a collar configured to releasably encircle the distal end of said first pipe and to be received in the recess abutting said shoulder, thereby preventing the collar and the distal end of the pipe passing through said hole; and
   a second pipe flange configured for attachment to said first pipe flange to operably connect a tail pipe to said first pipe and to hold together said pipe, said first pipe flange and said collar;
   wherein the counterweight is provided with fixing points adjacent said channel passing through said counterweight, the fixing points being arranged such that said second pipe flange is substantially aligned with the first pipe flange when the second pipe flange is secured to the counterweight by way of said fixing points.

* * * * *